Figure 1:
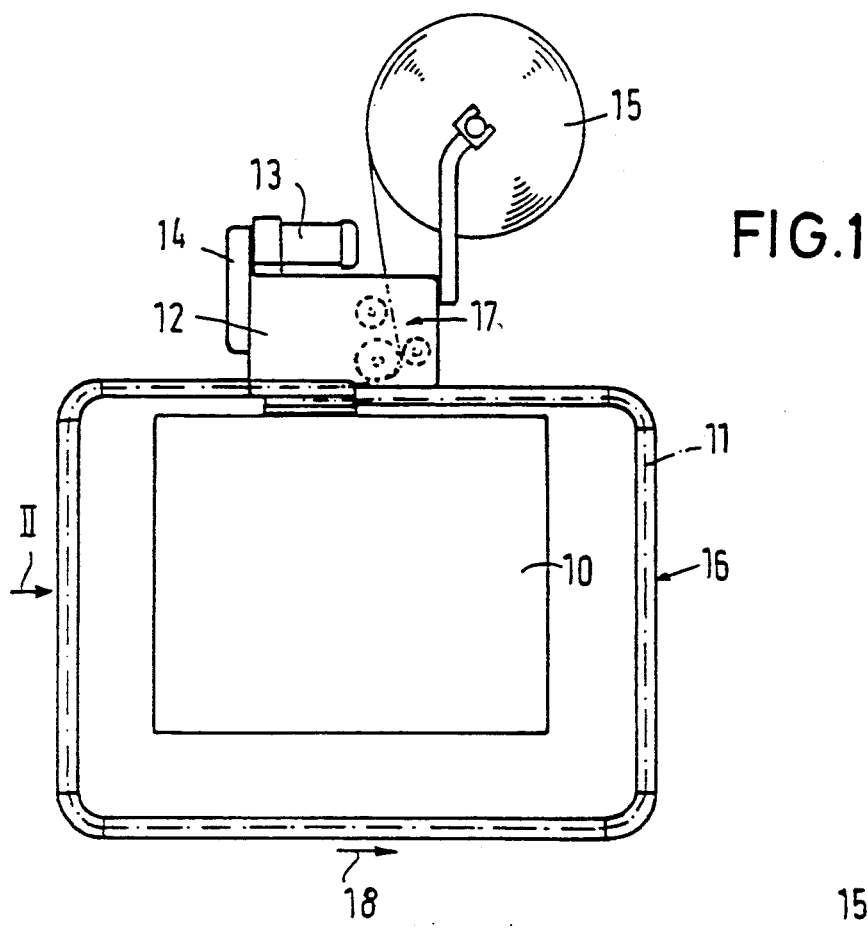

United States Patent [19]

Boek et al.

[11] Patent Number: 5,141,591
[45] Date of Patent: Aug. 25, 1992

[54] DEVICE FOR THE CONNECTION OF OVERLAPPING PORTION OF A THERMOPLASTIC BAND

[75] Inventors: Alfred Boek, Erftstadt-Lechenich; Peter Galden, Cologne, both of Fed. Rep. of Germany

[73] Assignee: RMO Systempack GmbH Verpackungssysteme, Fed. Rep. of Germany

[21] Appl. No.: 705,985

[22] Filed: May 28, 1991

[51] Int. Cl.⁵ .................................... B29C 65/06
[52] U.S. Cl. .................................... 156/502; 156/580; 156/581; 156/73.5; 100/33 PB
[58] Field of Search ............. 156/73.5, 580.1, 580.2, 156/502, 580, 581; 100/33 PB; 228/2

[56] References Cited

U.S. PATENT DOCUMENTS

| | | | |
|---|---|---|---|
| 3,442,203 | 5/1969 | Kobiella | 100/26 |
| 3,442,734 | 5/1969 | Ericsson | 156/73.5 |
| 3,873,387 | 3/1975 | Schoening | 156/73.5 |
| 4,527,379 | 7/1985 | Bartzick et al. | 53/589 |
| 4,776,905 | 10/1988 | Cheung et al. | 156/73.5 |
| 4,952,271 | 8/1990 | Cheung et al. | 156/502 |

FOREIGN PATENT DOCUMENTS 0095644 12/1983 European Pat. Off. .
605262 10/1975 Switzerland .

OTHER PUBLICATIONS

Examiner's Report to the Comptroller dated Jul. 11, 1991.

*Primary Examiner*—David A. Simmons
*Assistant Examiner*—J. Sells
*Attorney, Agent, or Firm*—Diller, Ramik & Wight

[57] ABSTRACT

For connecting two band portions (11a, 11b) by friction welding, one band portion (11a) is pressed against an abutment (20) by a clamping jaw (24), and the other band portion (11b) is pressed against the abutment (20) by another clamping jaw (25). An oscillating jaw (26) is arranged between the clamping jaws for performing reciprocating movements transversely to the band (11) and thus welding the overlapping band portions (11a, 11b) to each other by friction welding. For preventing shear stresses between the oscillating jaw (26) and that clamping jaw (25) which holds the band portion (11b) entrained by the oscillating jaw, this clamping jaw (25) is driven in synchronism with the oscillating jaw (26) and with the same amplitude as the oscillating jaw (26). Facing the clamping jaw (25), there is arranged a smooth support face (23) for allowing sliding movement of the band (11) thereon.

4 Claims, 3 Drawing Sheets

DEVICE FOR THE CONNECTION OF OVERLAPPING PORTION OF A THERMOPLASTIC BAND

The invention is directed to a device for the connection of overlapping portions of a thermoplastic band.

Thermoplastic bands are frequently used for packing purposes, i.e. for wrapping a cardboard box, a pallet load or other goods to be packed. In doing so, the band is laid around the goods destined for packing, and one end portion of the band is connected to another band portion while the band is cut off at the same time. Also, it is a known practice to connect the bands by friction welding, with one of the band portions being held fast and the other band portion being frictionally moved relative to the first band portion at high moving frequency. By the thus generated frictional heat, a firm connection of the two band portions is obtained. This technique offers the advantage that, with the pack of goods being tied up by a surrounding band, the two ends of the band are tightly interconnected without the need for mechanical connecting means. Since such bands are cut apart for removing the packing and thus are throw-away articles, the omission of connecting members is cost-saving.

In known packing machines, the end portions of the band wrapped around the packed goods are superimposed onto each other, and each of said ends is pressed against an abutment by a separate clamping jaw. The overlapping area of the band portions is located in the area between the clamping jaws. In this area, a reciprocating oscillating jaw is arranged for acting on the upper band portion and frictionally moving said band portion relative to the lower band portion held on the abutment. During the periodical movement of the oscillating jaw, the clamping jaws, being arranged to both sides of the oscillating jaw, are at a standstill for holding the respective band portion fixed. Since the clamping jaws are arranged close to the oscillating jaw, the upper band—being moved by the oscillating jaw but held fast by the adjoining clamping jaw—is subjected to strong shear stresses in a very short range, which shear stresses can lead to breakage of the band especially in case of large oscillating amplitudes. In a machine known from CH-605 262, designed for connecting the overlapping portions of a thermoplastic band by friction welding, there are provided two closely adjacent jaws for commonly pressing the overlapping band portions against a vibrator. Both of the jaws present claws, which is also the case for the vibrator. For welding connection of the band portions, the vibrator is set into reciprocating motion parallel to the planes of the bands. Thereby, the two band faces rubbing against each other are softened, with none of the two bands being held outside the overlapping area in this phase. Thus, friction welding is carried out while the bands are subjected to tension. This machine operates only with low band tensions and thick bands because clamping of the bands is effected immediately at the softening location. In case of thin bands or higher band tension, the bands will tear apart at the ends of the softening area.

It is an object of the invention to provide a device for the connection of overlapping portions of a thermoplastic band which provides for safe welding of the band portions without danger of damaging the bands or decreasing the band strength.

In the device of the invention, the clamping jaw holding the upper band portion is driven together with the oscillating jaw in such a manner that said clamping jaw generally performs the same movements as the oscillating jaw while keeping the band portion firmly pressed against the abutment. Thus, transverse relative movements between the oscillating jaw and said clamping jaw are prevented. Accordingly, no shear stresses of the band occur in the area between the oscillating jaw and the clamping jaw so that, in this area, the band is subjected to only slight mechanical stresses or none at all. Thus, local peak stresses of the band during friction welding are eliminated and there is no danger of breaking or weakening of the band.

In a preferred embodiment of the invention, the abutment facing the carried-along clamping jaw has a smooth support face for sliding movement of the respective band portion thereon. Alternatively, this abutment can be arranged separately from that of the oscillating jaw and the other clamping jaw, and be provided for being entrained. However, using a smooth support face allowing sliding movement is advantageous in so far as one abutment can be used in common for both clamping jaws and the oscillating jaw.

For preventing that the band is exposed to shear stress in the direction of the normal line, the support face on the abutment can have an elevated shape. The elevation may be relatively small because its only purpose is to provide that the band portion in its supported condition extends in rectilinear direction between the respective clamping jaw and the adjacent oscillating jaw and that no kinking is caused.

An embodiment of the invention will be explained in greater detail hereunder with reference to the drawings.

Figure 2:
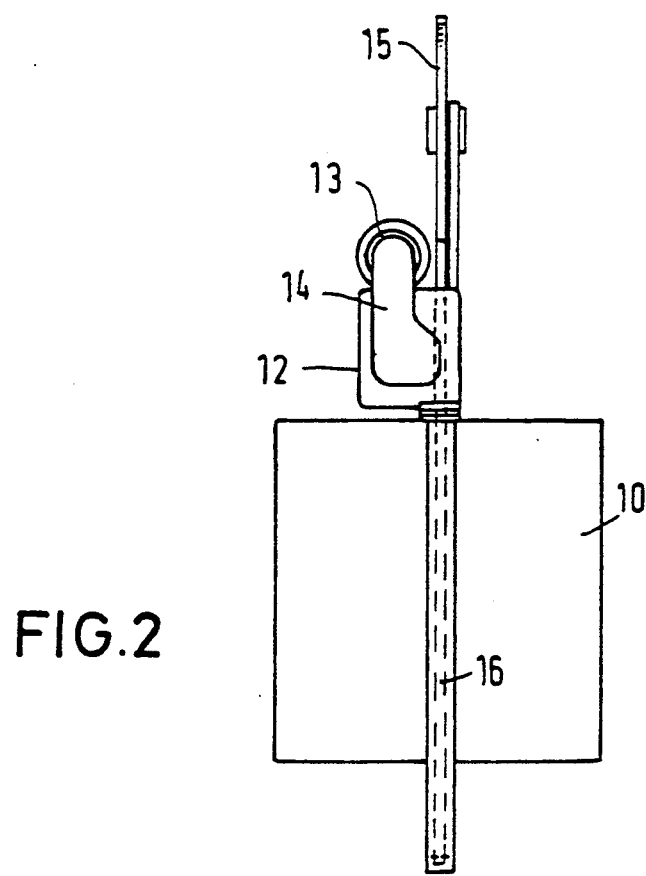
Figure 3:
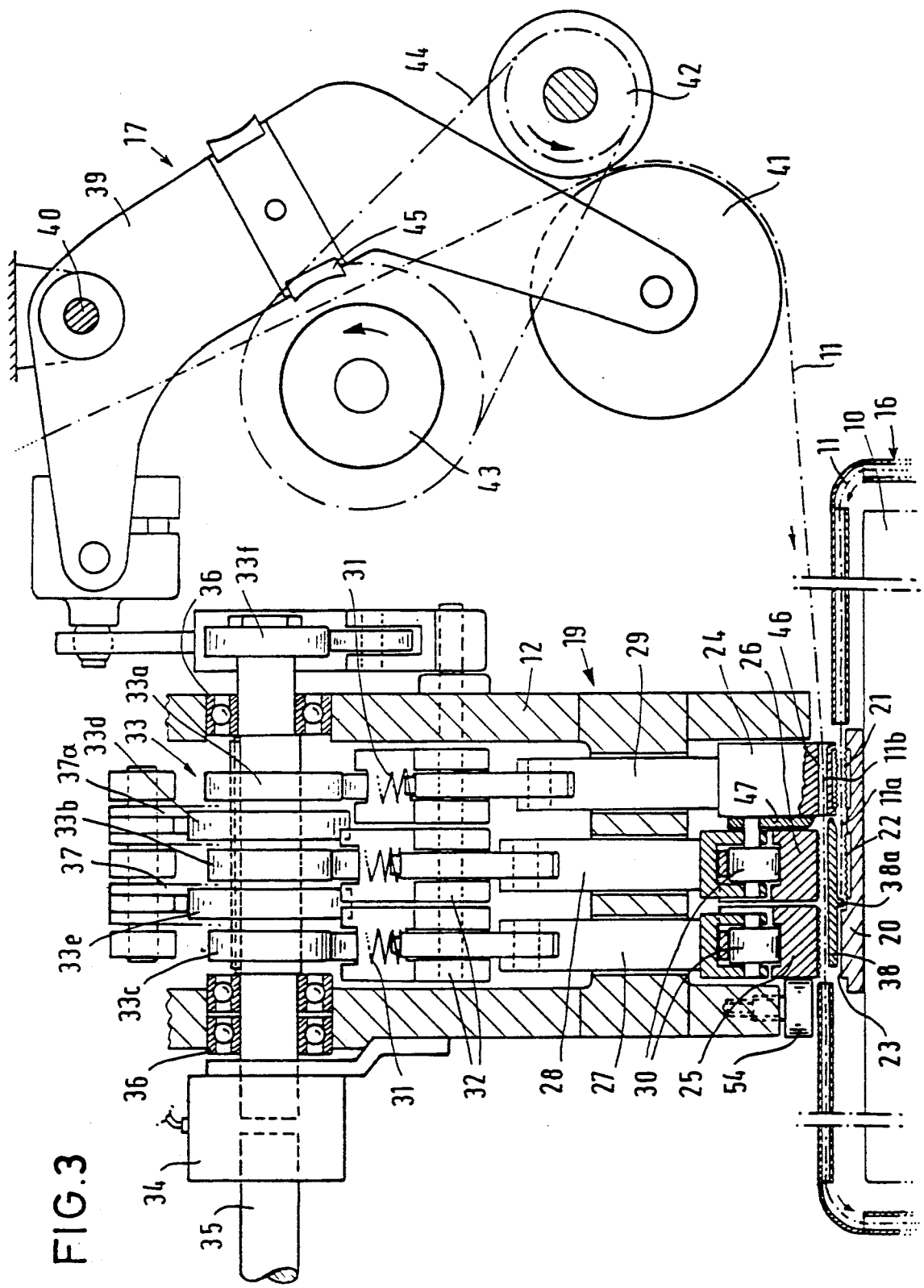
Figure 4:
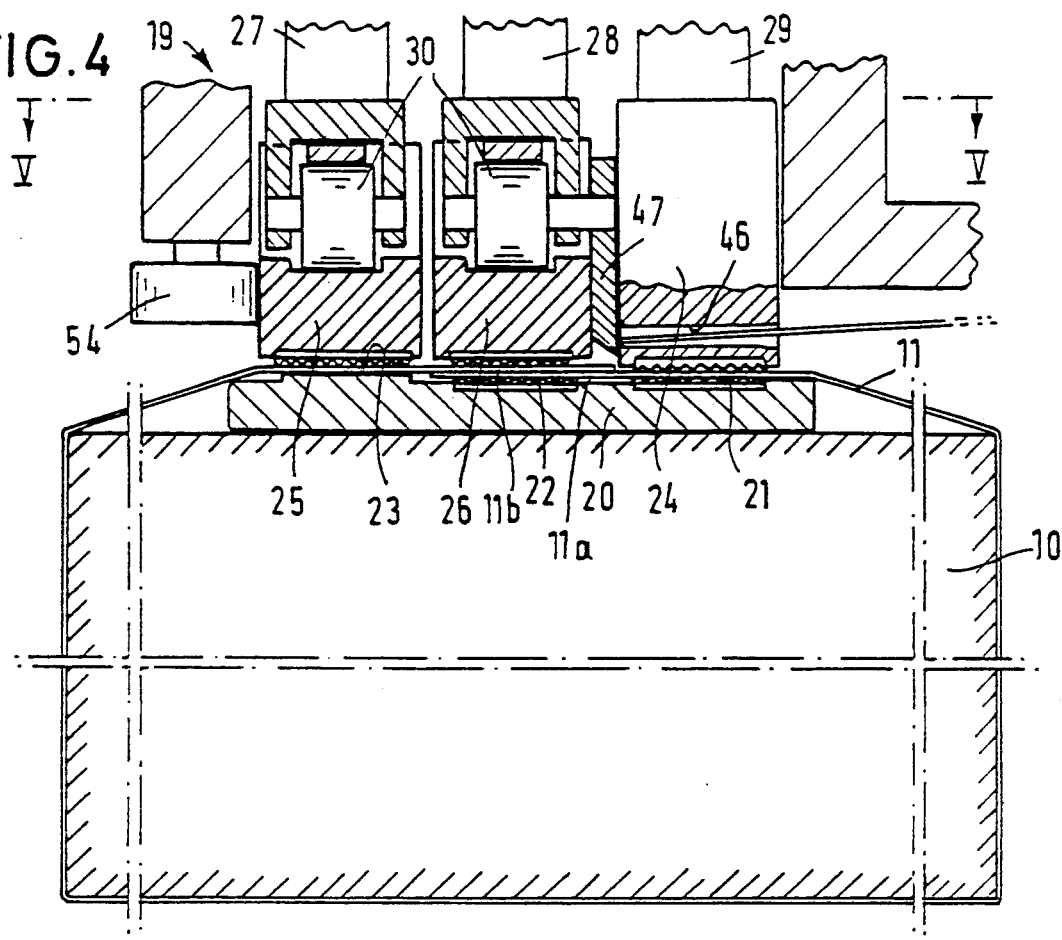
Figure 5:
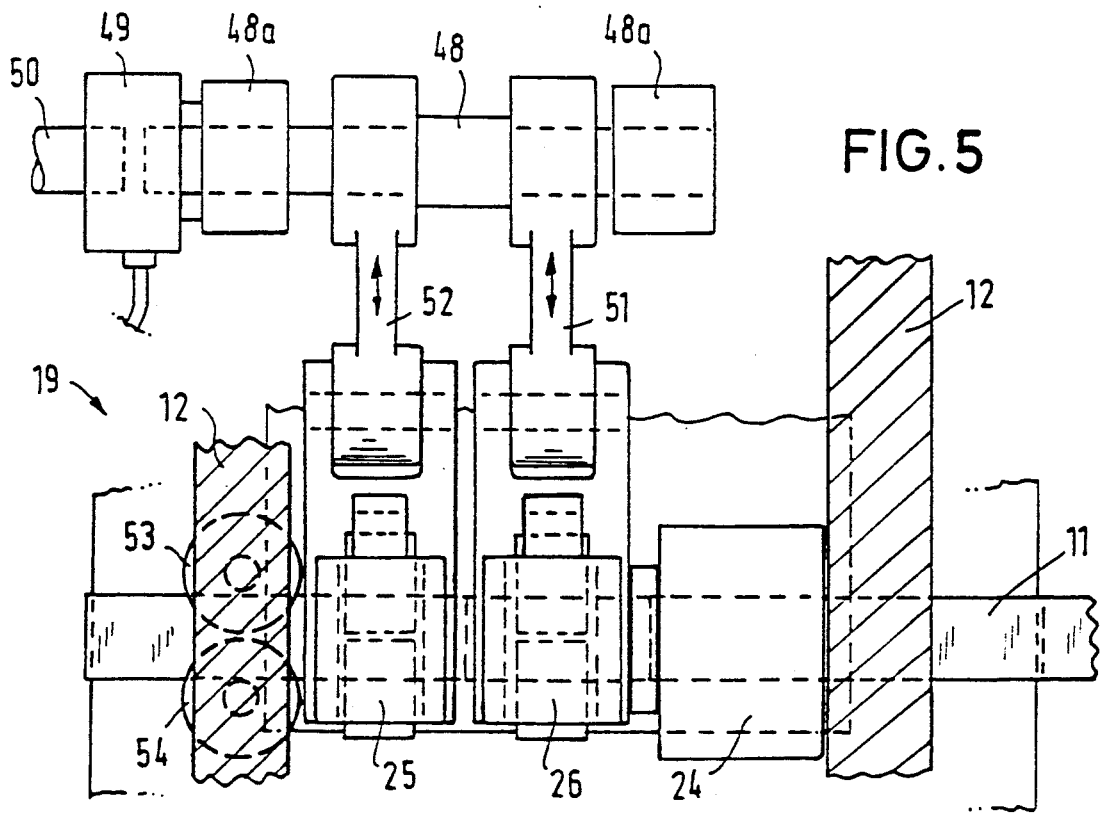

FIG. 1 is a schematic view of a packing machine for laying a band around the goods to be packed, subsequently pulling the band tight, then welding the band ends to each other and finally cutting off the band, FIG. 2 is a view of the packing machine as seen from the direction of arrow II of FIG. 1, FIG. 3 is a vertical sectional view of the packing machine, FIG. 4 shows, from the same perspective as in FIG. 3 and at a larger scale, the function of the clamping jaws and the oscillating jaw during the friction welding, and FIG. 5 is a horizontal sectional view along the line V—V of FIG. 4.

The device shown in FIG. 1 is provided for tightly wrapping a thermoplastic band 11 around goods 10 to be packed and for tying up said goods with the band. The device has a housing 12 with a drive motor 13 mounted thereon for driving the belt drive and the other parts of the device via a transmission 14 and various coupling means. An arm of housing 12 supports a band-supply drum 15 from which the band 11 is unwound.

The underside of housing 12 has a frame mounted thereon, forming a guide channel 16 surrounding the packed goods 10 at a distance. The band 11 is inserted, by a drive mechanism 17 arranged in housing 12, into this guide channel in such a manner that the band is moved in the direction of arrow 18 until a closed loop has been established in guide channel 16. Then, the band is pulled back by the drive mechanism whereby flaps are opened at the inner side of guide channel 16 and the band leaves the guide channel in inward direction. Thereupon, the band is held fast merely by the tensioning and connecting mechanism provided at the underside of housing 12 until the band tightly encloses the packed goods 10. Then, the ends of the band are connected to each other and the band is cut off from the band held on the supply drum.

FIGS. 3-5 show the tensioning and connecting mechanism 19 provided with an abutment 20 contacting the upper side of the packed goods 10. Said abutment is adapted to be moved transversely to the band and to be laterally withdrawn from under the band 11 after completion of the closing process. The abutment 20, as seen in longitudinal direction of the band, is provided successively with a corrugated holding face 21, a further corrugated holding face 22 and a raised smooth support face 23.

Above holding face 21, there is arranged a vertically displaceable clamping jaw 24 whose underside is also corrugated for cooperation with holding face 21. Above support face 23, there is provided a further clamping jaw 25, again with a corrugated underside. The oscillating jaw 26, having a corrugated underside, is arranged above holding face 22. The clamping jaws 24,25 and the oscillating jaw 26 are vertically moved by rams 27,28,29 guided for vertical displacement, with the clamping jaw 25 and the oscillating jaw 26 being supported at ram 27 and 28 resp. by rollers 30 for performing horizontal movements transversely to the band.

Rams 27,28,29 are pressed down by a respective spring 31 and are moved by levers 32 controlled by a cam shaft 33. A cam disk 33a controls the vertical movement of clamping jaw 24, a cam disk 33b controls the vertical movement of oscillating jaw 26 and a cam disk 33c controls the vertical movement of clamping jaw 25. Cam shaft 33 is connected, through a coupling means 34, to a drive shaft 35 driven by motor 13 and is supported by bearings 36 of housing 12.

Cam shaft 33 is provided with still further cam disks 33d and 33e for controlling, through a respective lever 37 or 37a pivoted to the housing, the transverse movements of abutment 20 and of an abutment plate 38 movable on abutment 20.

Finally, cam shaft 33 has provided thereon still another cam disk 33f for controlling a lever 39 of drive mechanism 17. Said lever 39 is pivoted on a bearing 40 of housing 12 and has its end provided with a freely rotatable presser roller 41 for guiding therearound the band 11 supplied from supply drum 15. Two drive rollers 42 and 43 are supported on the housing, being driven in common and coupled by a drive belt 44 in such a manner that they rotate in an identical sense of rotation.

Lever 39 is controlled by cam disk 33f for movement into two different positions. In one position, lever 39 presses band 11 against drive roller 42 by use of presser roller 41, and in the other position, lever 39 presses band 11 against drive roller 43 by use of a pressing jaw 45. In the first position of lever 39, the band is driven by drive roller 42 towards the tensioning and connecting mechanism 19, and in the second position, the band is pulled by drive roller 43 in the opposite direction and thus is tensioned.

While being advanced by drive roller 42, the band passes through a channel 46 of clamping jaw 24 and subsequently runs through guide channel 16. Then, the leading band portion 11a is returned to the tensioning and connecting mechanism 19 while abutting against an abutment portion 38a of abutment plate 38 (FIG. 3). This abutment of the leading band portion against abutment plate 38 switches the coupling means 34 into its active state by actuation of a swich means (not shown). First, clamping jaw 24 is moved downwards by cam disk 33a so that the leading band portion is clamped between clamping jaw 24 and holding face 21. Further, lever 39 is switched into its alternative position so that the band is driven in return direction by drive roller 43. Now, the band is freed from guide channel 16, the wall portions thereof snapping inwardly into their opened positions, and the band is laid around the goods 10 to be packed.

After the band has been firmly tied around the packed goods, the abutment plaate 38 is laterally withdrawn by cam disk 33e while the abutment 20 still remains in its position under band 11. Then, by the action of cam disks 33c and 33b, clamping jaw 25 and oscillating jaw 26 are pressed downwards, resulting in the condition shown in FIG. 4. A knife 47, mounted on oscillating jaw 26, cuts apart the band at the end of channel 46 of clamping jaw 24. In the overlapping area between the two clamping jaws 24 and 25, the band portions 11a and 11b lie on top of each other. It is in this overlapping area that oscillating jaw 26 is effective, with the lower band portion 11a being held fast on holding face 22 and the upper band portion being held fast on the underside of oscillating jaw 26. Then, oscillating jaw 26 is set into oscillating horizontal motion. This is performed by a crankshaft 48 which, by a coupling means 49, is coupled to a permanently rotating shaft 50. Said crankshaft 48 drives oscillating jaw 26 via a crank drive connection 51 so that oscillating jaw 26, while being firmly pressed against upper band portion 11b, carries out reciprocating horizontal movements. Thereby, the upper band portion 11b is moved relative to the fixedly held lower band portion 11a. Within a time period of about a second, the two band portions are welded to each other by frictional heat.

The crankshaft 48 supported in bearings 48a is arranged for driving, via a further crank drive connection 52, the clamping jaw 25 which retains upper band portion 11b. During this driving action, band portion 11b slides on the smooth support face 23 while carried along by the corrugated portion on the underside of clamping jaw 25. Movement of clamping jaw 25 is equiphase with that of oscillating jaw 26 and is carried out with the same amplitude so that the band 11 between clamping jaw 25 and oscillating jaw 26 is not affected by shear movements.

For supporting the clamping jaw 25 while the band is pulled tight, two rollers 53,54 are provided on the housing, which rollers are rotatable about vertical axes and allow the clamping jaw to slide with low friction.

We claim:

1. A device for the connection of overlapping portions (11a,11b) of a thermoplastic band (11) by friction welding, comprising a first clamping jaw (24) for pressing a band portion (11a) against an abutment (20), a second clamping jaw (25) for pressing the other band portion (11b) against an abutment, the two clamping jaws defining an overlapping area of the band portions, and an oscillating jaw (26) engaging one of the band portions in the overlapping area and frictionally displacing said band portion by oscillating movement relative to the other band portion parallel to the band planes, characterized in that the clamping jaw (25) of the band portion (11b) engaged by the oscillating jaw (26) is driven in synchronism with the oscillating jaw (26) while moving parallel to the oscillating movement of the oscillating jaw (26).

2. The device according to claim 1 wherein, facing the clamping jaw (25) moved along with the oscillating jaw (26), there is arranged a fixed smooth support face (23) of the abutment (20) for allowing sliding movement thereon of the band portion (11b) pressed by the clamping jaw (25).

3. The device according to claim 2 wherein the support face (23) on the abutment (20) is arranged in an elevated position.

4. The device according to claim 1 wherein the driven clamping jaw (25) is moved exclusively in transverse direction to the band.

* * * * *